United States Patent
Shon et al.

(10) Patent No.: US 8,516,252 B2
(45) Date of Patent: Aug. 20, 2013

(54) METHOD AND APPARATUS FOR AUTHENTICATING A SENSOR NODE IN A SENSOR NETWORK

(75) Inventors: Tae-Shik Shon, Suwon-si (KR); Yong-Suk Park, Seoul (KR); Soon-Seob Han, Seoul (KR); Kwang-Jo Kim, Daejeon (KR); Kyu-Suk Han, Daejeon (KR); Jang-Seong Kim, Daejeon (KR)

(73) Assignee: Samsung Electronics Co., Ltd (KR)

( * ) Notice: Subject to any disclaimer, the term of this patent is extended or adjusted under 35 U.S.C. 154(b) by 468 days.

(21) Appl. No.: 12/823,694

(22) Filed: Jun. 25, 2010

(65) Prior Publication Data

US 2010/0332831 A1 Dec. 30, 2010

(30) Foreign Application Priority Data

Jun. 26, 2009 (KR) ........................ 10-2009-0057778

(51) Int. Cl.
*H04L 29/06* (2006.01)
(52) U.S. Cl.
USPC ........................................... 713/168; 726/10

(58) Field of Classification Search
None
See application file for complete search history.

(56) References Cited

U.S. PATENT DOCUMENTS

| 7,924,150 | B2* | 4/2011 | Baldus et al. ............ 340/539.12 |
| 8,107,397 | B1* | 1/2012 | Bagchi et al. ................. 370/254 |
| 2007/0011435 | A1* | 1/2007 | Lee .................................. 712/15 |
| 2008/0162939 | A1* | 7/2008 | Lee et al. ...................... 713/171 |
| 2009/0154482 | A1* | 6/2009 | Ham et al. .................... 370/408 |

* cited by examiner

*Primary Examiner* — Hadi Armouche
(74) *Attorney, Agent, or Firm* — The Farrell Law Firm, P.C.

(57) ABSTRACT

A method and apparatus for authenticating a sensor node in a sensor network. The method for authenticating a sensor node by a first sink node in a sensor network includes receiving an authentication request using an authentication ticket from the sensor node, identifying a second sink node which has issued the authentication ticket, decoding the authentication ticket using a group key, which is previously stored in correspondence to the second sink node to confirm the validity of the authentication ticket, when the second sink node is included in a neighboring node list, normally processing authentication for the sensor node, generating an authentication ticket using a group key of the first sink node, and transmitting the generated authentication ticket to the sensor node.

20 Claims, 9 Drawing Sheets

METHOD AND APPARATUS FOR AUTHENTICATING A SENSOR NODE IN A SENSOR NETWORK

PRIORITY

This application claims priority under 35 U.S.C. §119(a) to Korean Patent Application No. 10-2009-0057778, which was filed in the Korean Intellectual Property Office on Jun. 26, 2009, the content of which is hereby incorporated by reference.

BACKGROUND OF THE INVENTION

1. Field of the Invention

The present invention relates generally to a sensor network, and more particularly, to a method and apparatus for authenticating a sensor node when connecting to a sink node.

2. Description of the Related Art

A sensor network is a wireless network for ubiquitous computing, which includes a plurality of ultra-light, low-power sensors. With the introduction of a ubiquitous computing concept, a method which is capable of applying the ubiquitous computing to real life is actively being studied and sensor networks, which will be able to provide realistic ubiquitous environments have been raised as a main issue.

Sensor networks are being widely used in a field, which has limitations in arrangement. For example, a few thousand sensor networks are widely used for real-time traffic monitoring, building safety monitoring (e.g., structure, fire and physical safety monitoring), military sensing and detection, earthquake activity measurement, real-time pollution monitoring, wildlife monitoring, wild fire detection, etc.

A sensor network includes many sensor nodes and performs many functions to sense information through the sensors and to process the sensed information. Although the sensor network can acquire and process a variety of information using the sensors, the sensor network should be able to ensure information integrity and personal privacy from a large amount of sensed information. Namely, for a more realistic and smooth ubiquitous computing environment, the development of security mechanism in the sensor network, which can safely process and manage the sensed information, should be studied and applied, together with the utilization of the sensor network and the development of sensor techniques. Accordingly, a variety of methods for authenticating sensor nodes by a sink node have been proposed.

For example, there is a scheme in which information necessary to authenticate all sink nodes is dispersed in consideration of the mobility of the sink nodes and all the sink nodes participate in an authentication process of any sink node. See R. Fantacci, F. Chiti, and L. Maccari, Fast Distributed Bi-directional Authentication for Wireless Sensor Networks, John Wiley & Sons, Security and Communication Networks, vol. 1, pp 17-24, 2008 (hereinafter FCM08).

In the FCM08 scheme, respective sink nodes of a sensor network have the same performance and include parts of information, which they can use to authenticate each other. A first sink node, which newly participates in the sensor network, makes a request to a second sink node, which has already participated in the sensor network, to perform authentication. The second sink node receives the authentication information about the first sink node from a third sink node, a fourth sink node, etc. which have already participated in the sensor network and performs the authentication process.

As another authentication method, lower cluster headers are assigned an authentication function to efficiently perform a process of authenticating a node in a topology formation step of the sensor network, thereby dispersing overhead in the authentication process of the node. Each cluster header previously has a list for partial information about nodes and requests a Base Station (BS) node to transmit the other information about connected nodes to confirm the other authentication information. See J. Ibriq and Imad Mahgoub, A Hierarchical Key Establishment Scheme for Wireless Sensor Networks, Proceedings of $21^{st}$ International Conference on Advanced Networking and Applications (AINA '07), pp. 210-219, 2007 (hereinafter IM07).

In another authentication method, there is a scheme using a secret key. To allocate a secret key to a sensor node, a sink node serving as a BS generates the pool of keys, divides the generated keys into a plurality of matrixes to distribute rows and columns, and allocates the keys to the sensor node. The rows and columns distributed to the sensor node are used to search for a common secret key necessary for security authentication.

In the authentication method using the secret key, a distributed sensor network may be constructed to have a common key pool, which is previously allocated to each node, and accordingly to have rings of keys, and a shared key, which is commonly present, may be detected by comparing the rings of keys.

Existing sensor networks have focused on an application field of a static environment, but a sensor network of a dynamic environment using mobile nodes is also being gradually established. Accordingly, an authentication process suitable for such a dynamic environment is needed.

In a sensor network, sink nodes generally have a static construction, but sensor nodes may move to other locations. After moving, the sensor nodes are switched from one sink node to another sink node and, thus, reauthentication may be requested. However, because a conventional authentication method does not consider reauthentication, the same authentication procedure is performed at every authentication. However, it is inefficient for an adjacent sink node to perform reauthentication using the same process, because a previously connected sink node has already performed authentication for a sensor node.

For example, in the above FCM08 scheme, because each node participates in the authentication process, there is some overhead. If the same process is performed at every node authentication, the number of authentication processes will increase during node authentication according to the network arrangement state of each node and communication overhead will increase.

In the IM07 scheme, because partial information of nodes should be previously distributed to a cluster header to perform authentication for nodes, information about all the nodes on a network should be previously stored. Moreover, the above-described scheme is not suitable when mobility of nodes including new participation and elimination of nodes is considered.

Further, there are few considerations for node reauthentication according to a topology change of a node, after a sensor network topology is formed.

The previous distribution method of keys of the sensor network does not consider reauthentication like the IM07 scheme.

SUMMARY OF THE INVENTION

The present invention is designed to address at least some of the above-mentioned problems and/or disadvantages and to provide at least the advantages described below.

Accordingly, an aspect of the present invention provides an authentication method and apparatus, which efficiently reauthenticate a node when a mobile sensor node moves from a sink node, after initial authentication, and is reconnected to another sink node in a dynamic environment of a sensor network.

Another aspect of the present invention provides an authentication method and apparatus, which rapidly authenticate a sensor node during reauthentication.

Another aspect of the present invention provides an authentication method and apparatus, which reduce resource use by a mobile sensor node.

Another aspect of the present invention provides an authentication method and apparatus, which reduce the use of resources of a sensor network and decrease overhead.

In accordance with an aspect of the present invention, a method for authenticating a sensor node by a first sink node in a sensor network is provided. The method includes receiving an authentication request using an authentication ticket from the sensor node; identifying a second sink node that issued the authentication ticket; decoding the authentication ticket using a group key that is stored in correspondence to the second sink node to confirm the validity of the authentication ticket, when the second sink node is included in a neighboring node list; normally processing an authentication for the sensor node; generating an authentication ticket using a group key of the first sink node; and transmitting the generated authentication ticket to the sensor node.

In accordance with another aspect of the present invention, an apparatus for authenticating a sensor node by a first sink node in a sensor network is provided. The apparatus includes a wireless transceiver; a storage device for storing a neighboring node list including sink nodes located within a wireless communication range of the first sink node and for storing group keys corresponding to the sink nodes included in the neighboring node list; and a controller for receiving an authentication request using an authentication ticket from the sensor node through the wireless transceiver, identifying a second sink node that issued the authentication ticket, decoding the authentication ticket using a group key that is stored in correspondence to the second sink node to confirm validity of the authentication ticket, when the second sink node is included in the neighboring node list, normally processing an authentication for the sensor node, generating an authentication ticket using a group key of the first sink node, and transmitting the generated authentication ticket to the sensor node through the wireless transceiver.

In accordance with another aspect of the present invention, a method for authenticating a sensor node in a sensor network is provided. The method includes receiving a HELLO message from a sink node; confirming whether an authentication ticket is received, when the sink node is not a currently connected sink node; transmitting the authentication ticket to the sink node to request authentication, when the authentication ticket is received; and receiving and storing an arbitrary authentication ticket issued by the sink node, after the sink node determines that the transmitted authentication ticket is a valid ticket issued by one of neighboring nodes of the sink node and normally performs authentication for the sensor node.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will be described below with reference to the accompanying drawings. The following detailed description includes specific details in order to provide a thorough understanding of the present invention. However, it will be apparent to those skilled in the art that the present invention may be practiced without such specific details.

A sensor network is a wireless network for ubiquitous computing, which includes a plurality of ultra-light, low-power sensors. In the sensor network, information is gathered by a plurality of sensor nodes that are connected by one network. For example, the sensors may sense a geographical, environmental variation of a field, and then transmit the sensed information to a BS node, and transmit the sensed information to users through a sensor network server.

Figure 1:
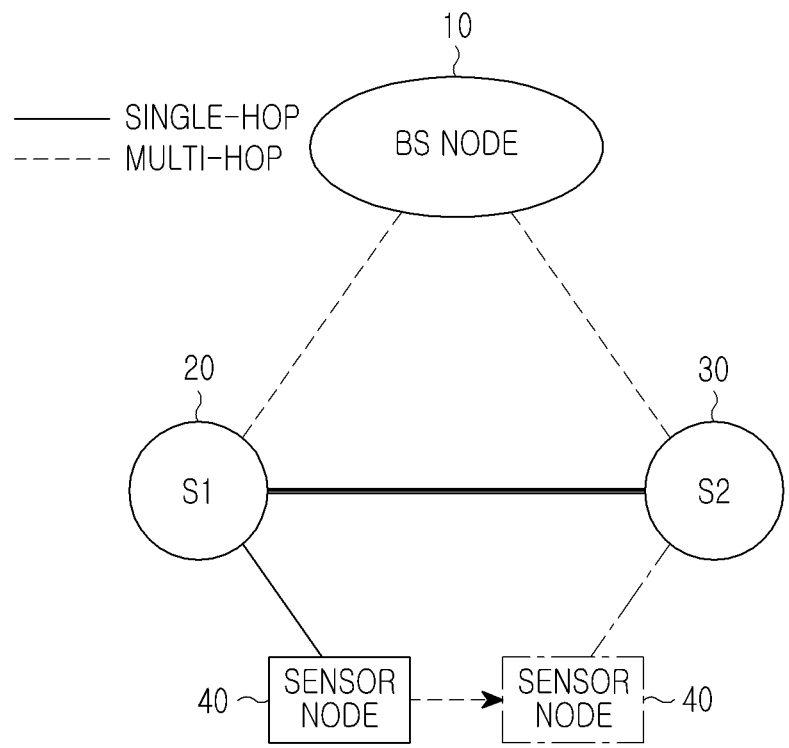
FIG. 1 is a diagram illustrating a configuration of a sensor network according to an embodiment of the present invention.

A configuration of a sensor network according to an embodiment of the present invention is illustrated in FIG. 1.

Referring to FIG. 1, a sensor network includes at least one BS node 10, one or more sink nodes (S1 and S2) 20 and 30, and one or more sensor nodes 40.

Data sensed by the sensor nodes 40 within the sensor network is collected by sink nodes 20 and 30, which are adjacent to the sensor nodes 40, and is transferred to an external network, such as the Internet, via the BS node 10 and is further transferred to users through the external network. The sensor nodes 40 are low-cost, ultra-light, and low-power devices (generally using a battery). The sensor nodes 40 may be installed at a predetermined location or may be included in mobile devices, for example, vehicles, Personal Digital Assistants (PDAs), notebook computers, and cellular phones. In this embodiment, the sensor nodes 40 are mobile.

Figure 3A:
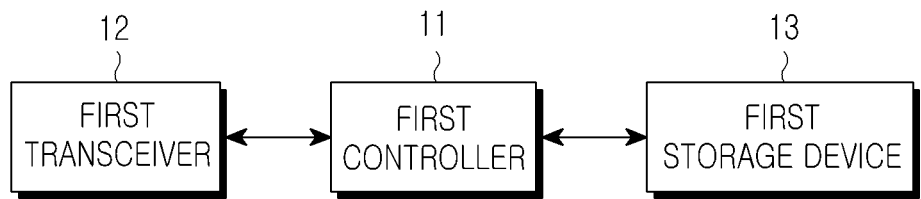
FIG. 3A is a block diagram illustrating a configuration of a 13S node according to an embodiment of the present invention.
Figure 3B:
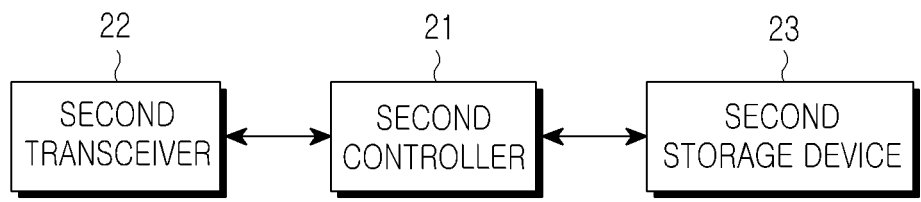
FIG. 3B is a block diagram illustrating a configuration of a sink node according to an embodiment of the present invention.
Figure 3C:
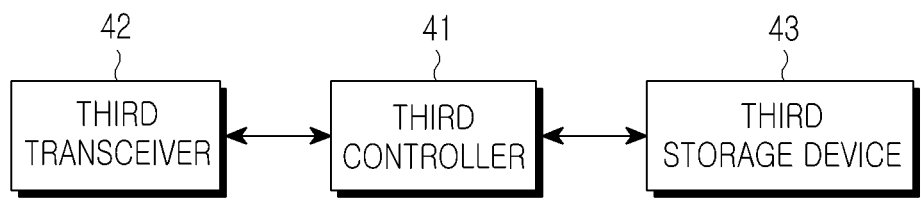
FIG. 3C is a block diagram illustrating a configuration of a sensor node according to an embodiment of the present invention.

An example of the sensor node 40 is illustrated in FIG. 3C. The sensor node 40 includes a sensor for a sensing operation, an Analog-to-Digital Converter (ADC) (not shown) for converting sensing information into a digital signal, a third controller 41 for processing data and controlling an overall operation, a third storage device 43 used as a working memory, in which data is stored, a battery (not shown) for supplying a power source, and a third transceiver 42 for transmitting/receiving radio data. According to an embodiment of the present invention, the third storage device 43 stores authentication tickets in correspondence to sink nodes that have issued the authentication tickets.

Sink nodes 20 and 30 manage and control the sensor nodes 40 within the sensor network, collect data sensed by the sensor nodes 40, and transmit the collected data to the BS node 10. Sink nodes 20 and 30 are connected to the BS node 10 by multi-hop on wireless network topology. According to an embodiment of the present invention, sink nodes 20 and 30 are neighboring nodes, and if connection is requested by the sensor node 40, they connect the sensor node 40 to the network after authentication processing. In the present invention, sink nodes adjacent to each other or neighboring nodes indicate that respective nodes are located within an each other's wireless communication distance.

An example of a sink node is illustrated in FIG. 3B. Although FIG. 3B illustrates a configuration of sink node 20, other sink nodes also have similar configurations.

Referring to FIG. 3B, sink node 20 includes a second transceiver 22 for transmitting and receiving radio data, a second controller 21 for processing data and controlling an overall operation, a second storage device 23 used as a working memory, in which data is stored, and a battery (not shown) for supplying a power source. According to the embodiment of the present invention, the second storage device 23 includes a neighboring node list and a group key list. Group keys of the group key list are stored in correspondence to sink nodes included in the neighboring node list.

The BS node 10 transmits data received from sink nodes 20 and 30 to the external network and performs authentication processing for sink nodes 20 and 30 or the sensor node 40 at the request of sink nodes 20 and 30.

A configuration of the BS node 10 according to the embodiment of the present invention is illustrated in FIG. 3A.

Referring to FIG. 3A, the BS node 10 includes a first transceiver 12 for transmitting and receiving radio data, a first controller 11 for processing data and controlling overall operation, and a first storage device 13 used as a working memory, in which data is stored. The first storage device 13 stores authentication information about sink nodes and sensor nodes included in the sensor network. The authentication information includes information used in the process of authentication.

Figure 2:
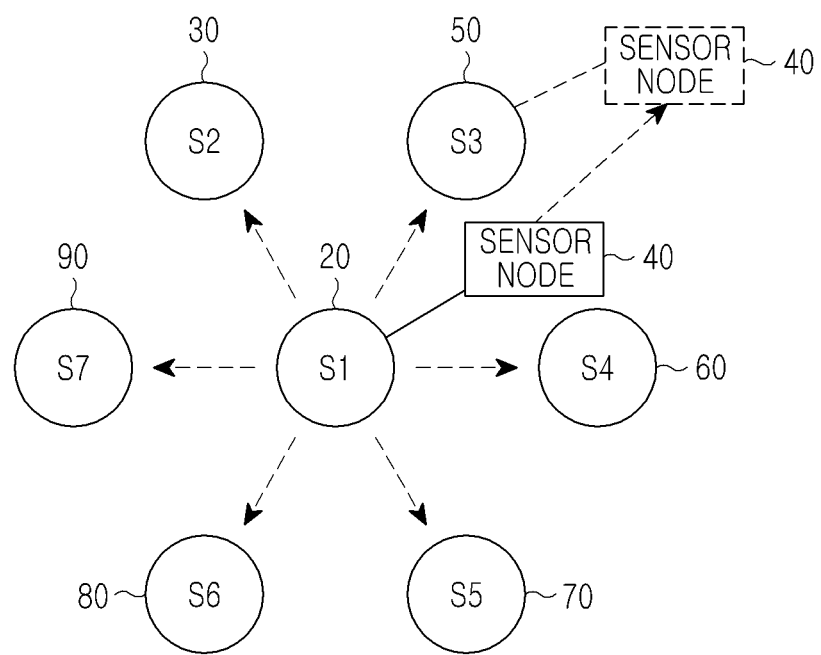
FIG. 2 is a diagram illustrating an arrangement of sink nodes according to an embodiment of the present invention.

In the sensor network, as described above, the sensor node 40 is first connected to sink node 20. However, if the location of the sensor node 40 is changed to another place, the sensor node 40 is reconnected to a neighboring sink node, for example, sink node 30. As illustrated in FIG. 2, when a plurality of sink nodes 20, 30, 50, 60, 70, 80 and 90 are adjacently located, the sensor node 40 will be reconnected to the nearest sink node, for example, sink node (S3) 50 according to the direction it is moving.

The present invention uses an authentication ticket to efficiently and rapidly process a reauthentication procedure of a sensor node, which may be generated in the sensor network. The authentication ticket represents that a neighboring sink node has already performed proper authentication for a corresponding sensor node. The authentication ticket is issued by a sink node and is transmitted to a sensor node.

To generate the authentication ticket, sink node identifies neighboring nodes, adds the neighboring nodes to a neighboring node list, generates group keys, and exchanges the group keys with sink nodes included in the neighboring node list. If the sensor node is first connected to sink node, it requests sink node to perform initial authentication. Sink node performs the initial authentication for the sensor node through a BS node, generates the authentication ticket using the group key, and transmits the authentication ticket to a corresponding sensor node. The sensor node receives and stores the authentication ticket. If the sensor node should be connected to another sink node due to its movement, the sensor node transmits the authentication ticket to the new sink node. Upon receiving the authentication ticket, the new sink node confirms a neighboring node list and group key list stored therein. If the authentication ticket is determined as a ticket issued by a neighboring node, the new sensor node performs connection. The new sink node issues a new authentication ticket using its group key and transmits the authentication ticket to the sensor node. The sensor node uses the authentication ticket, which is received and stored most recently, during reauthentication.

Figure 4:
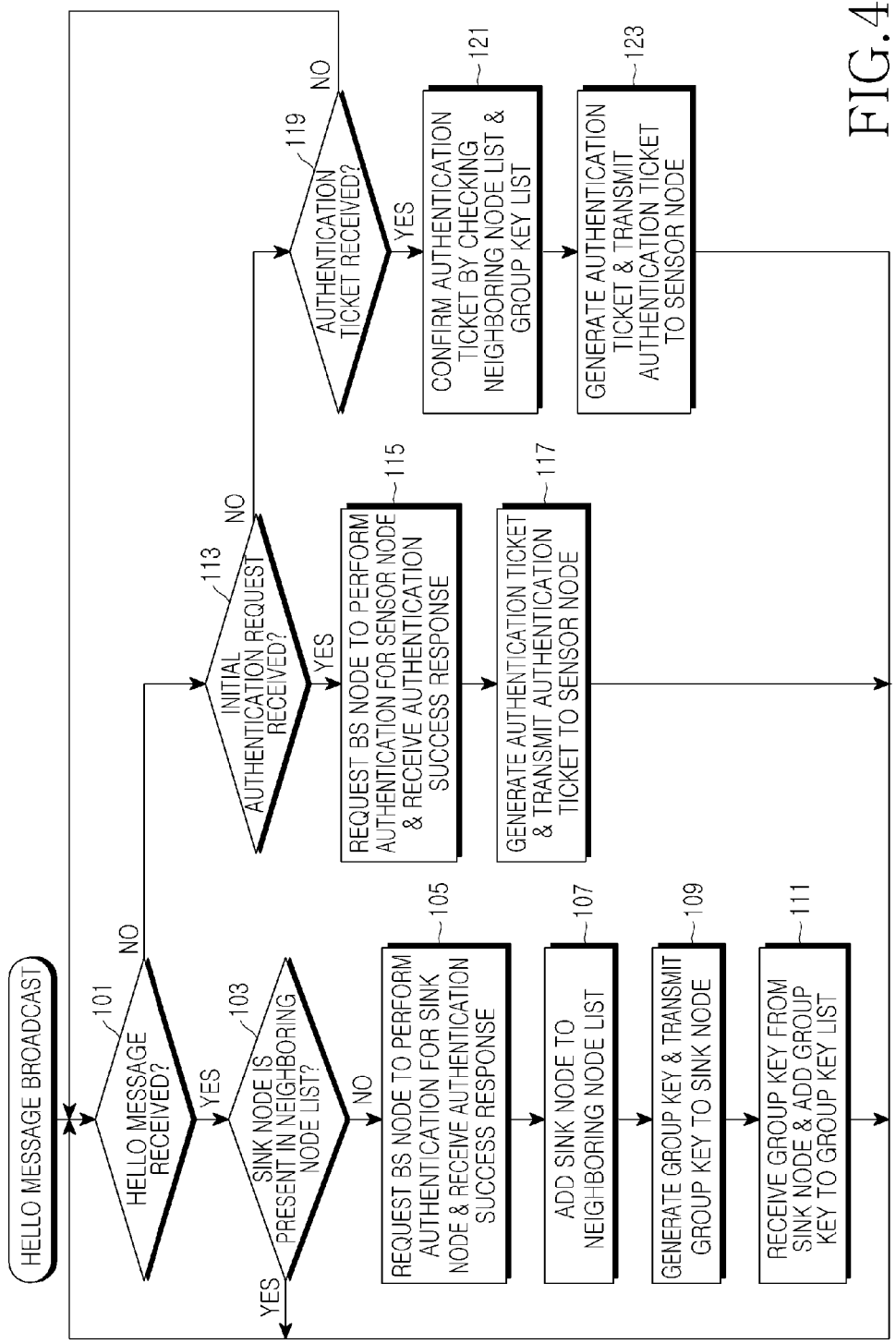
FIG. 4 is a flow chart illustrating an operation process of a sink node according to an embodiment of the present invention.

The above-described operation process of the sink node according to the present invention is illustrated in FIG. 4. Although FIG. 4 illustrates an operation process of sink node 20 according to an embodiment of the present invention, the other sink nodes 30, 50, 60, 70, 80 and 90 are also similarly operated.

Referring to FIG. 4, the second controller 21 of sink node 20 periodically configures a HELLO message and broadcasts the message through the second transceiver 22. The HELLO message refers to a message for adding searched neighboring sink nodes to a neighboring node list or leading connection of a sensor node located within a wireless communication distance of the sink nodes.

While periodically broadcasting the HELLO message, sink node 20 may receive a HELLO message transmitted by a neighboring sink node. If the HELLO message is received through the second transceiver 22 in step 101, the second controller 21 determines whether a sink node, which has transmitted the HELLO message, is present in the neighboring node list in step 103. If it is not present, the second controller 21 requests the BS node 10 to perform authentication for the sink node in step 105.

Upon receiving an authentication request for any sink node through the second transceiver 22 from sink node 20, the BS node 10 performs authentication using authentication information stored in the second storage device 23 and informs sink node 20 of an authentication result.

Upon receiving an authentication success response through the second transceiver 22 from the BS node 10 in step 105, sink node 20 adds the corresponding sink node to a neighboring node list stored in the second storage device 23 in step 107. The second controller 22 transmits a message indicating that the corresponding sink node has been added as a neighboring node to the corresponding sink node through the second transceiver 22. Then the corresponding sink node also adds sink node 20 as a neighboring node.

The second controller 21 of sink node 20 generates its group key and transmits the generated group key to the corresponding sink node in step 109. The corresponding sink node receives and stores the group key of sink node 20 and transmits its group key to sink node 20.

Sink node 20 receives the group key of the corresponding sink node through the second transceiver 22 and adds the received group key to a group key list stored in the second storage device 23 in correspondence to the corresponding sink node in step 111. Step 111 is followed by step 101.

Through the process described above, sink node 20 adds an adjacent sink node to a neighboring node list and collects and stores a group key of each node included in the neighboring node list. If initial authentication or reauthentication is requested by an arbitrary sensor node, sink node 20 performs a corresponding operation.

While the sink node broadcasts the HELLO message, the sensor node receiving the message confirms a connection state with the corresponding sink node. If the sensor node is not connected to the sink node, the sensor node attempts connection. An authentication procedure is performed in the connection process.

Figure 5:
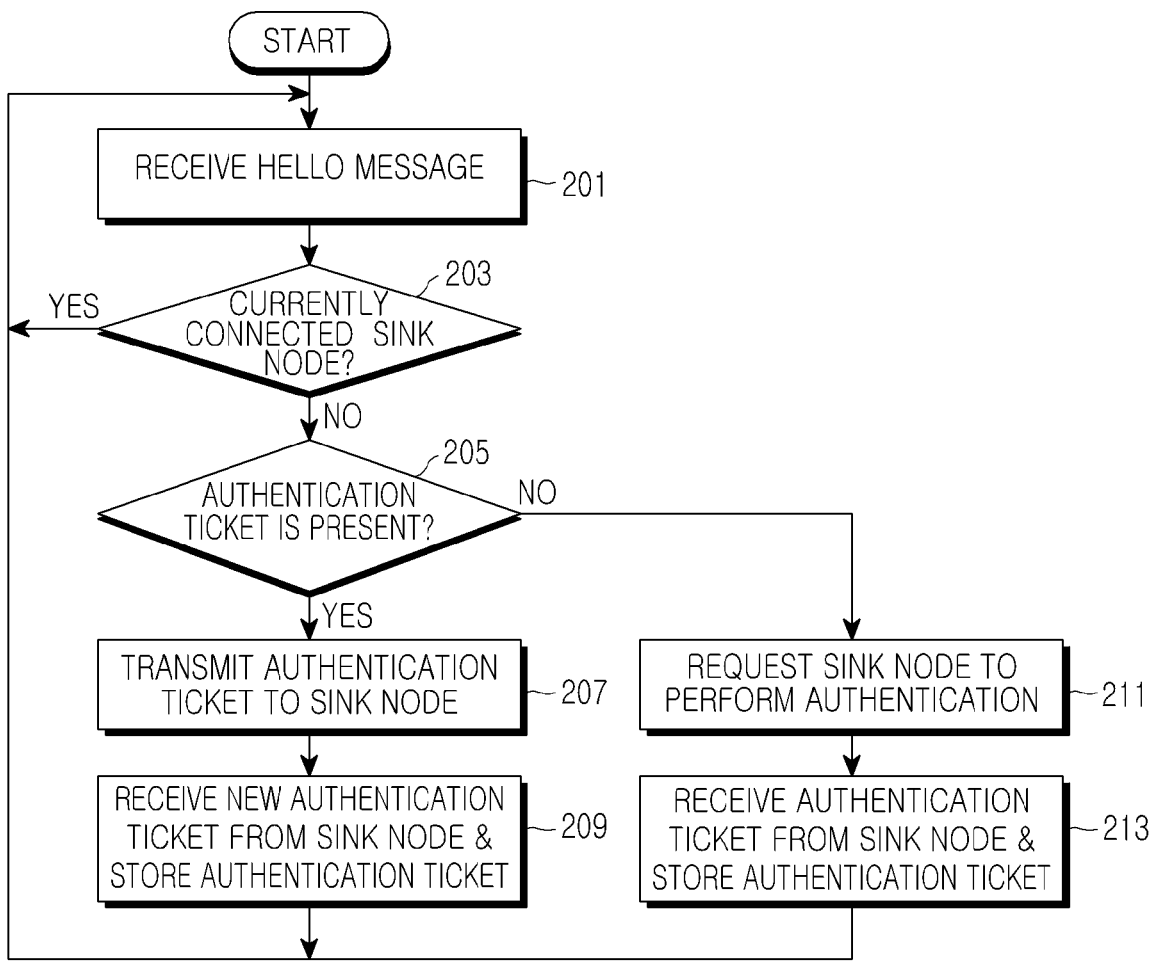
FIG. 5 is a flow chart illustrating an operation process of a sensor node according to an embodiment of the present invention.

An operation process of the sensor node for the authentication process is illustrated in FIG. 5. Although FIG. 5 shows the operation process of sensor node 40, a similar process is applied to other sensor nodes.

Referring to FIG. 5, if the third controller 41 of the sensor node 40 receives the HELLO message through the third transceiver 42 in step 201, the third controller 41 decides whether a sink node which has transmitted the HELLO message is a currently connected sink node in step 203. If it is a currently connected sink node, the third controller 41 returns to step 201 without any additional operation, and if not, the third controller 41 confirms whether an authentication ticket is present in the third storage device 43 in step 205. The presence of an authentication ticket means that authentication has already been performed. Accordingly, the presence of the authentication ticket indicates that initial authentication of the sensor node 40 has performed through another sink node. In the embodiment of the present invention, a decision as to whether to request initial authentication for a sink node to which connection is attempted or to request reauthentication using the authentication ticket is made depending on whether the authentication ticket is present.

In another embodiment of the present invention, whether to request initial authentication or to request reauthentication may be determined by confirming additional authentication history rather than the authentication ticket.

If the authentication ticket is not present in the third storage device 43 in step 205, the third controller 41 requests a corresponding sink node through the third transceiver 43 to perform initial authentication in step 211. An operation process of the sink node receiving the initial authentication request is as illustrated in steps 113 to 117 in FIG. 4.

Referring back to FIG. 4, if sink node 20 receives the initial authentication request from any sensor node, for example, sensor node 40 in step 113, the second controller 21 of sink node 20 requests the BS node 10 to perform authentication for the sensor node 40 in step 115. The first controller 11 of the BS node 10 performs authentication for the sensor node 40 using authentication information stored in the first storage device 13. The first controller 11 transmits the authentication result to sink node 20 through the transceiver 12.

Upon receiving a response indicating authentication success, sink node 20 generates an authentication ticket using its group key and transmits the authentication ticket to the sensor node 40 in step 117. The authentication ticket includes an Identification (ID) of a sink node, which has issued the ticket, and the period of validity of the ticket.

The sensor node 40 receives the authentication ticket (refer back to FIG. 5) through the third transceiver 43 and stores the ticket in the third storage device 43 in step 213. The authentication ticket is stored until the period of validity and may be deleted when the period of validity has expired. Next, sink node 20 performs a connection operation to the sensor node 40.

If the sensor node 40 has the authentication ticket, the third controller 43 requests a corresponding sink node to perform reauthentication by transmitting the stored authentication ticket to the sink node in step 207. The transmitted authentication ticket is a ticket, which has been received and stored most recently.

An operation process of the corresponding sink node receiving the authentication ticket is as shown in steps 119 to 123 of FIG. 4.

Referring to FIG. 4, if the sink node 20 receives the authentication ticket from any sensor node, for example, the sensor node 40 in step 119, the sink node 20 checks a neighboring node list and a group key list stored in the second storage device 23 to confirm that the authentication ticket is issued by a sink node which is present in the neighboring node list in step 121. The second controller 21 generates an authentication ticket using its group key and transmits the authentication ticket to sensor node 40 in step 123.

Sensor node 40 receives a new authentication ticket from the sensor node 20 and stores the ticket in the third storage device 43 in step 209. Step 209 is followed by step 201.

If it is determined that the period of validity of the authentication ticket has expired in step 121, sink node 20 may determine that a corresponding authentication ticket is not valid irrespective of a type of a sink node which has issued the authentication ticket. Alternatively, even when a sink node, which has issued the authentication ticket, is not present in the neighboring node list, sink node 20 may determine that a corresponding ticket is not valid. In this case, the sink node 20 may inform sensor node 40 that authentication has failed, and sensor node 40, which has received the failure message, may request sink node 20 to perform initial authentication.

A messaging process associated with the operation of the sink node, sensor node and BS node is described with reference to Table 1 and FIGS. 6 to 9. More specifically, Table 1 explains functions included in data transmitted/received between respective nodes in the messaging process, and FIGS. 6 to 9 illustrate the messaging process between the nodes.

TABLE 1

| Term | Description |
| --- | --- |
| E{K, m} | Symmetric key encryption of message m using secret key K |
| h(m) | Hashed value of message m |
| MAC(K, m) | Message Authentication Code (MAC) generation of message m using secret key K |
| TS | Time stamp |
| KDF | Key derivation function |
| R | Random number |
| IA | Authentication between sinks |
| IIA | Initial authentication between sink and node |
| IRA | Reauthentication between sink and node |

If a plurality of sink nodes 20, 30, 50, 60, 70, 80, and 90 is adjacently located as illustrated in FIG. 2, each of them may receive each other's HELLO message. As described above, the HELLO message is a periodically broadcast message in order for a sink node to search for other adjacent sink nodes and sensor nodes. Although the HELLO message is transmitted by each of the sink nodes 20, 30, 50, 60, 70, 80, and 90, a messaging process in which the sink node 20 or 30 transmits and receives the HELLO message is described below by way of example.

A process for the sink node (S1) 20 to search for an adjacent node and to add the node as a neighboring node is described with reference to FIG. 6.

Figure 6:
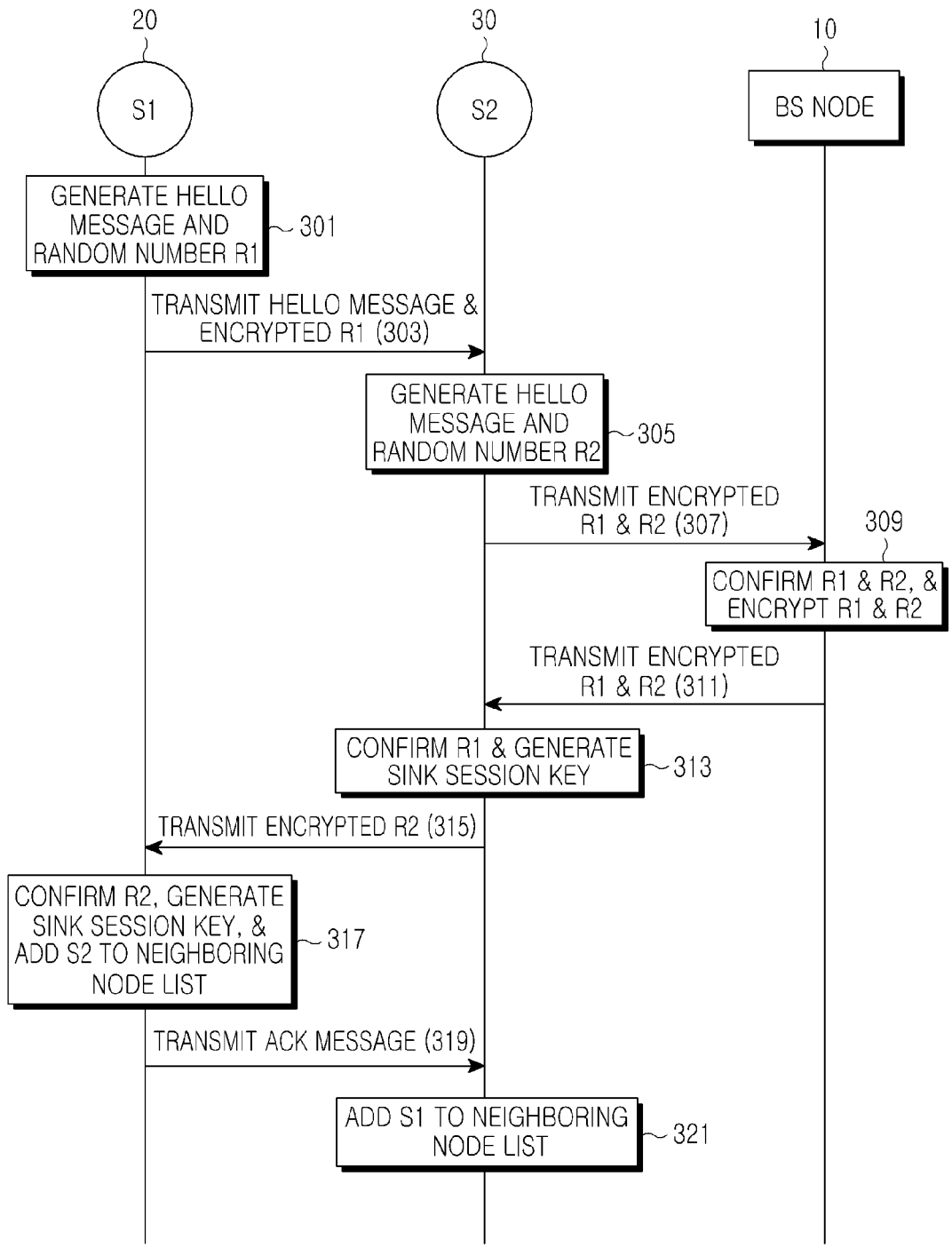
FIGS. 6 to 9 are flowcharts illustrating messaging processes according to an embodiment of the present invention.

Referring to FIG. 6, the sink node (S1) 20 periodically broadcasts a HELLO message in order to search for adjacent sink nodes or to derive a connection of a sensor node. To this end, the sink node (S1) 20 generates a random number R1, and encrypts the random number R1 to a unique secret key K_S1 allocated thereto, thereby generating an encryption function "u[0]=E{K_S1, R1||TS0}" and a Message Authentication Code (MAC) "v[0]=MAC(K_S1, S1||HELLO||u[0]}" in step 301. The sink node (S1) 20 configures a HELLO message including its ID S1, the encryption function u[0] and the MAC v[0], and broadcasts the HELLO message in step 303.

The sink node (S2) 30 receives the HELLO message broadcast by the sink node (S1) 20 and determines whether the sink node (S1) 20 is present in a neighboring node list. If it is determined that the sink node (S1) 20 is included in the neighboring node list, the sink node (S2) 30 stops an operation and, if not, the sink node (S2) 30 requests the BS node 10 to confirm the HELLO message. Accordingly, the sink node (S2) 30 generates a random number R2, and encrypts the random number R2 and the encryption function u[0], using a unique secret key K_S2 allocated thereto, thereby generating an encryption function "u[1]=E{K_S2, R2||u[0]}" and a MAC "v[1]=MAC(K_S2, S2||BS||S1||u[1]||v[0])" in step 305. Next, the sink node (S2) 30 requests the BS node 10 to perform authentication for the sink node (S1) 20 by transmitting, to the BS node 10, a transmitter ID S2, a receiver ID BS, a related sink node ID S1, the encryption function u[1], and the MACs v[1] and v[0] in step 307.

The BS node 10 then checks the validity of the HELLO message received from the sink node (S2) 30 and decodes the message to obtain the random number R2, and checks validity of the HELLO message of the sink node (S1) 20 and decodes the message to obtain the random number R1 generated by the sink node (S1) 20 and a time stamp TS0. Namely, the BS node 10 searches for authentication information stored in the first storage device 10 to detect the secret key K_S1 stored in correspondence to the sink node (S1) 20 and the secret key KS2 stored in correspondence to the sink node (S2) 30. The BS node 10 generates a MAC MAC(K_S2, S2||BS||S1||u[1]||v[0]) to check the validity of the MAC and decodes the encryption function u[1] to derive the random number R2. The BS node 10 generates a MAC MAC(K_S1, S1||HELLO||u[0]) to check the validity of the MAC v[0] and decodes the encryption function u[0] to derive the random number R1 and the time stamp TS0. The BS node 10 confirms whether the time stamp TS0 has expired, thereby completing authentication for the sink node (S1) 20.

The BS node 10 encrypts the random number R2 using the secret key K_S1 and encrypts the random number R1 using the secret key K_S2 to generate encryption functions "u[3]=E{K_S1, S1||S2||R2}" and "u[4]=E{K_S2, S2||S1||R1||u[3]}", and MACs "v[3]=MAC(K_S1, BS||S1||R1||u[3])" and "v[4]=MAC(K_S2, BS||S2||R2||u[4]||v[3])" in step 309. The BS node 10 informs the sink node (S2) 30 of an authentication result by transmitting a transmitter ID BS, a receiver ID S2, the encryption function u[4], and the MACs v[4] and v[3] to the sink node (S2) 30 in step 311.

The sink node (S2) 30 which has received the authentication result generates a MAC MAC(K_S2, BS||S2||R2||u[4]||v[3]) to check the validity of the MAC v[4], decodes the encryption function u[4] to obtain the random number R1 and the encryption function u[3], and checks the random number R1, thereby confirming that authentication has been successfully performed. The sink node (S2) 30 generates a sink session key "SK_S1S2=KDF(R1||R2)" by inputting "R1||R2" to a Key Derivation Function (KDF) and generates a MAC "v[5]=MAC(SK_S1S2, S2||S1||R2||R1)" for the random numbers R1 and R2 using the sink session key SK_S1S2 in step 313. Next, the sink node (S2) 30 transmits a transmitter ID S2, a receiver ID S1, a reference ID BS, the encryption function u[3] received by the BS node 10, and the MACs v[3] and v[5] to the sink node (S1) 20 in order to cause the sink node (S1) 20 to add itself as a neighboring node in step 315.

The sink node (S1) 20 generates a MAC MAC(K_S1, BS||S1||R1||u[3]) to check the validity of the MAC v[3] and decodes the encryption function u[3] to derive the random number R2. The sink node (S1) 20 generates a sink session key "SK_S1S2=KDF(R1||R2)" and a MAC MAC(SK_S1S2, S2||S1||R2||R1) to check the validity of the MAC v[5]. If it is determined that the MAC v[5] is valid, the sink node (S1) 20 judges that the sink node (S2) 30 is a neighboring node and adds the sink node (S2) 30 to its neighboring node list. The sink node (S1) 20 generates a MAC "v[6]=MAC(SK_S1S2, S1||S2||ACK||R1||R2)" using the sink session key SK_S1S2 and transmits an Acknowledgement (ACK) message including a transmitter ID S1, a receiver ID S2 and the MAC v[6] to the sink node (S2) 30 in steps 317 and 319.

Upon receiving the ACK message, the sink node (S2) 30 generates a MAC MAC(SK_S1S2, S1||S2||ACK||R1||R2) to check the validity of the MAC v[6]. If the MAC v[6] is determined to be valid, the sink node (S2) 30 determines that the sink node (S1) 20 is a neighboring node. Accordingly, the sink node (S2) 30 adds the sink node (S1) 20 to its neighboring node list in step 321.

In the above embodiment, while the sink node (S2) 30 has added the sink node (S1) 20 to the neighboring node list after receiving the ACK message from the sink node (S1) 20, the sink node (S2) 30 may perform step 315 after adding the sink node (S1) 20 to the neighboring node list.

Figure 7:
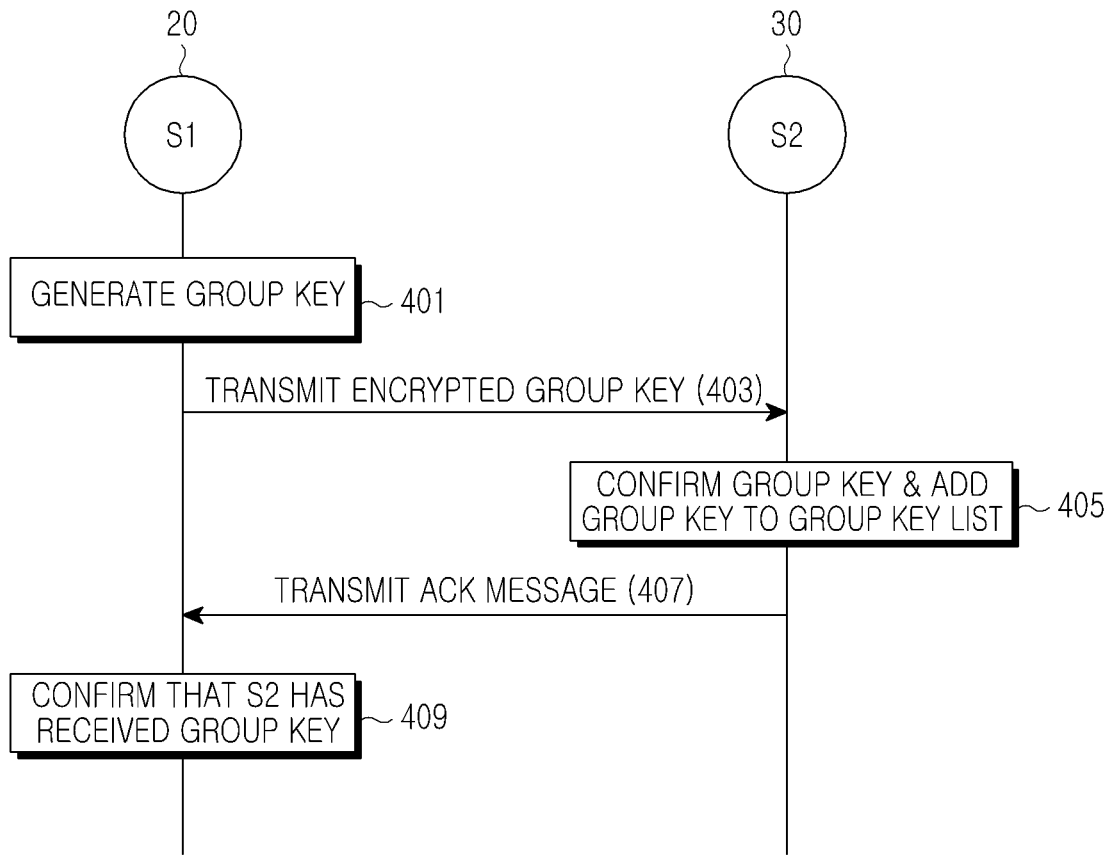

A process of exchanging a group key performed after adding each sink node to the neighboring node list is described with reference to FIG. 7. As shown in FIG. 7, sink node (S1) 20, which has added sink node (S2) 30 as a neighboring node generates a group key AK_S1 representing itself. Sink node (S1) 20 generates a random number R1, and encrypts the group key AK_S1 and the random number R1, using a sink session key SK_S1S2, thereby generating an encryption function "u[1]=E{SK_S1S2, AK_S1||R1}" and a MAC "v[1]=MAC(SK_S1S2, S1||S2||u[1])" in step 401. Next, the sink node (S1) 20 transmits the group key to the sink node (S2) 30 by transmitting a transmitter ID S1, a receiver ID S2, and the encryption function u[1] in step 403.

Upon receiving the group key, the sink node (S2) 30 confirms that the sink node (S1) 20 is a neighboring node through the neighboring node list. The sink node (S2) 30 generates a MAC MAC(SK_S1S2, S1||S2||u[1]) to check the validity of the MAC v[1] and decodes the encryption function u[1] to derive the group key AK_S1 and the random number R1. The sink node (S2) 30 adds the derived group key AK_S1 to a group key list so as to correspond to the sink node (S1) 20 and generates a MAC "v[2]=MAC(AK_S1, S2||S1||ACK||R1)" in step 405. The sink node (S2) 30 transmits an ACK message including a transmitter ID S2, a receiver ID S1 and the MAC v[2] to the sink node (S1) 20 in step 407.

Upon receiving the ACK message, the sink node (S1) 20 generates a MAC MAC(AK_S1, S2||S1||ACK||R1) to check the validity of the MAC v[2] and confirms that the sink node (S2) 30 has received the group key AK_S1 in step 409.

A process of transmitting the group key from the sink node (S2) 30 to the sink node (S1) 20 is the same as the above-described group key transmission process.

Figure 8:
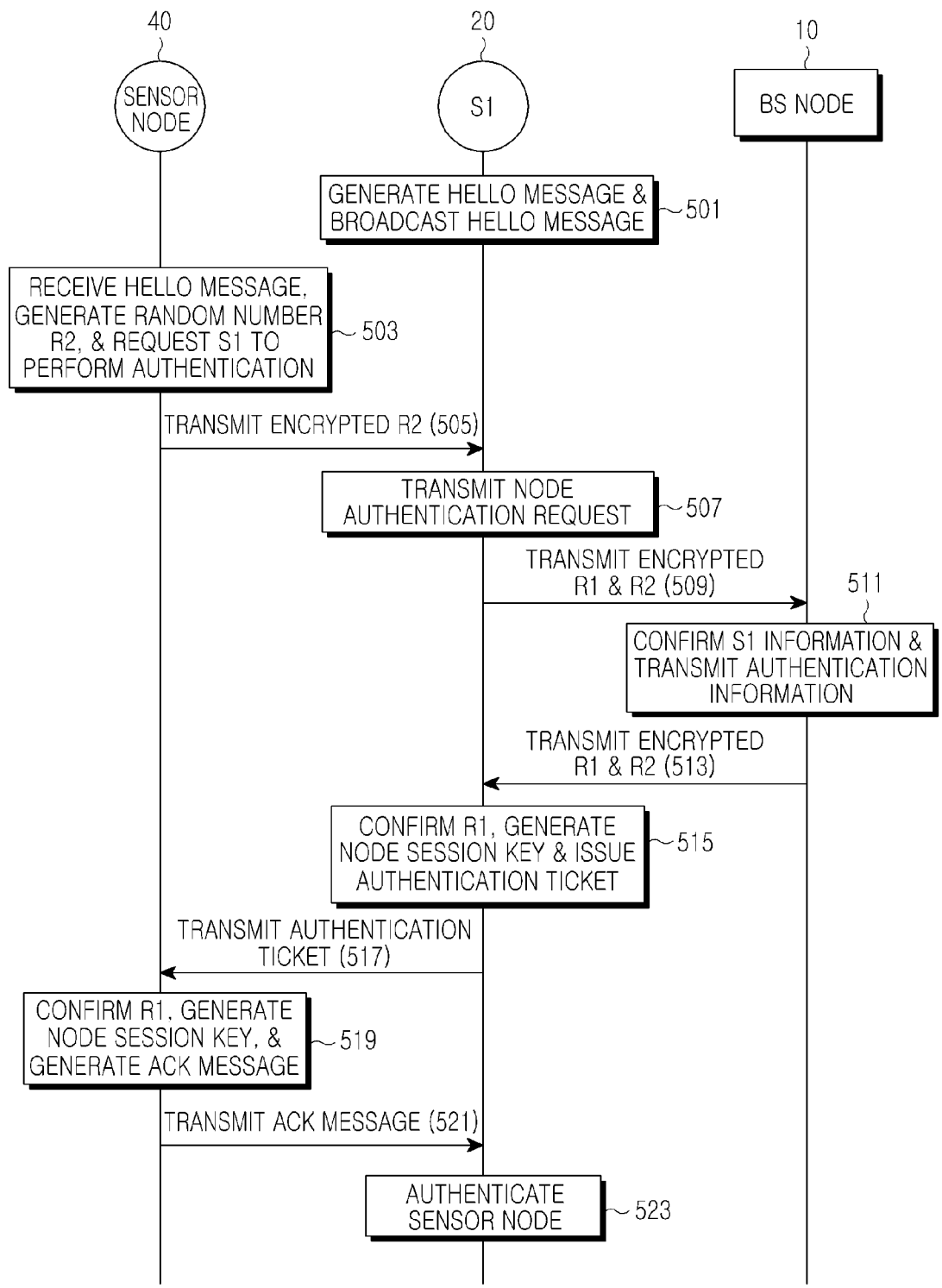
Figure 9:
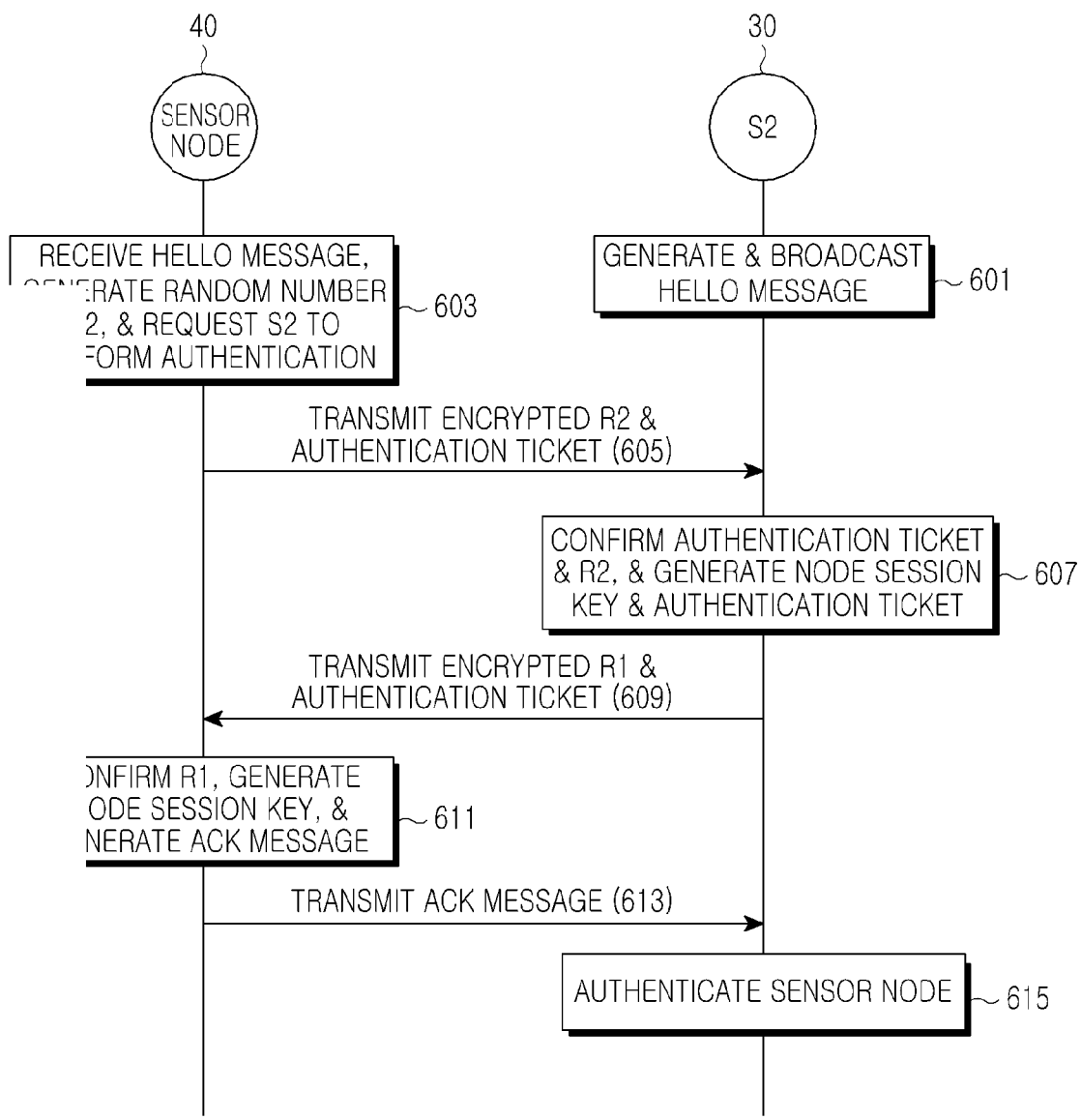

A messaging process according to initial authentication of a sensor node is described with reference to FIG. 8. The sink node (S1) 20 periodically generates a random number R1 in order to detect a neighboring sink node or to derive connection of a sensor node. The sink node (S1) 20 encrypts the random number R1 using a unique secret key K_S1 allocated thereto and generates an encryption function "u[0]=E{K_S1, R1||TS0}". The sink node (S1) 20 generates a MAC "v[0]=MAC(K_S1, S1||HELLO||u[0])", configures a HELLO message including its ID S1, the encryption function u[0] and the MAC v[0], and broadcasts the HELLO message in step 501. Step 501 and step 301 of FIG. 6 are identical.

If the sensor node 40 is located in a service area of the sink node (S1) 20, the sensor node 40 receives the HELLO message broadcast by the sink node (S1) 20. If the sensor node 40 has never been connected to any other sink nodes or has been disconnected during a predetermined period, the sensor node 40 requests the sink node (S1) 20 to perform initial authentication. To this end, the sensor node 40 generates a random number R2, encrypts the random number R2 using a secret key K_N allocated thereto, and encrypts the encryption function u[0] and the MAC v[0] included in the HELLO message to generate an encryption function "u[1]=E{K_N, R2||u[0]||v[0]}" and a MAC "v[1]=MAC(K_N, N||S1||u[1])" in step 503. The sensor node 40 requests the sink node (S1) 20 to perform initial authentication by transmitting a transmitter ID N, a receiver ID S1, the encryption function u[1] and the MAC v[1] in step 505.

The sink node (S1) 20 which has received the initial authentication request generates a MAC "v[2]=MAC(K_S1, S1||BS||N||u[1]||v[1])" in order to transmit the initial authentication request to the BS node 10 in step 507. The sink node (S1) 20 transmits a transmitter ID S1, a receiver ID BS, a related node ID N, the encryption function u[1], and the MACs v[1] and v[2] to the BS node 10 in step 509.

The BS node 10 which has received the initial authentication request for the sensor node 40 detects secret keys K_N and K_S1 corresponding to the sensor node 40 and the sink node (S1) 20, respectively from authentication information stored in the first storage device 13. The BS node 10 generates a MAC MAC(K_S1, S1||BS||N||u[1]||v[1]) to check the validity of the MAC v[2] and generates a MAC MAC(K_N, N||S1||u[1]) to check the validity of the MAC v[1]. If the MACs v[2] and v[1] are judges to be valid, the BS node 10 decodes the encryption function u[1] to derive the random number R2, the encryption function u[0] and the MAC v[0]. The BS node 10 generates a MAC MAC(K_S1, S1||HELLO||u[0]) to check the validity of the MAC v[0]. If the MAC v[0] is determined to be valid, the BS node 10 decodes the encryption function u[0] to derive the random number R1 and a time stamp TS0. The BS node 10 checks the validity of the time stamp TS0, and if it is determined the time stamp TS0 is valid, the BS node 10 judges that the authentication for the sensor node 10 has been successfully performed. To transmit such a judgment result to the sink node (S1) 20, the BS node 10 generates encryption functions "u[3]=E{K_N, R1}" and "u[4]=E{K_S1, R2||h(K_N||R2)||u[3]||v[3]}", and MACs "v[3]=MAC(K_N, BS||N||S1||u[3])" and "v[4]=MAC(K_S, BS||S1||N||R1||u[4])" step 511. The BS node 10 then transmits a transmitter ID BS, a receiver ID S1, a related node ID N, the encryption function u[4] and the MAC v[4] to the sink node (S1) 20 in step 513.

The sink node (S1) 20, which has received the authentication result, generates a MAC MAC(K_S, BS||S1||N||R1||u[4]) to check the validity of the MAC v[4]. If the MAC v[4] is determined to be valid, the sink node (S1) 20 decodes the encryption function u[4] to derive the random number R2, a Hash value h(K_N||R2), the encryption function u[3], and the MAC v[3] and confirms that the authentication for the sensor node 40 has been successfully performed. Then the sink node (S1) 20 generates a node session key "NK_N=KDF(R2||R1)" and issues an authentication ticket including an encryption function "t[1]=E{AK_S1, TS1||R2||h(K_N||R2)||NK_N}" encrypted by using its group key AK_S1 and including a MAC "w[1]=MAC(AK_S1, N||t[1])". The authentication ticket includes the ID of the sensor node 40 and the period of validity. The sink node (S1) 20 generates an encryption function "u[5]=E{NK_N, TS1||t[1]||w[1]}" and a MAC "v[5]=MAC(NK_N, S1||N||R2||u[5])" in step 515. The sink node (S1) 20 transmits the authentication ticket to the sensor node 40 by transmitting a transmitter ID S1, a receiver ID N, the encryption functions u[3] and u[5], and the MACs v[3] and v[5] in step 517.

The sensor node, which has received the authentication ticket, generates a MAC MAC(K_N, BS||N||S1||u[3]) to check the validity of the MAC v[3]. If the MAC v[3] is determined to be valid, the sensor node 40 decodes the encryption function u[3] to derive the random number R1. The sensor node 40 generates a node session key "NK_N=KDF(R2||R1)", and generates a MAC MAC(NK_N, S1||N||R2||u[5]) to check the validity of the MAC v[5]. If the MAC v[5] is determined to be valid, the sensor node 40 decodes the encryption function u[5] to derive and store a time stamp TS1, and authentication ticket, that is, the encryption function t[1] and the MAC w[1]. The sensor node 40 generates a MAC "v[6]=MAC(NK_N, S1||ACK||R2||R1)" and transmits an ACK message including a transmitter ID N, a receiver ID S1 and the MAC v[6] to the sink node (S1) 20 in steps 519 and 521.

The sink node (S1) 20, which has received the ACK message, generates a MAC MAC(NK_N, N||S1||ACK||R2||R1) to check the validity of the MAC v[6] and confirms that the sensor node 40 has received the authentication ticket, thereby completing an authentication process for the sensor node 40 in step 523.

In this way, if the initial authentication for the sensor node 40 has been completed, the sink node (S1) 20 is connected to the sensor node 40 to perform data communication. If the sensor node 40 moves and thus it is away from a wireless service area, the sink node (S1) 20 and the sensor node 40 are disconnected. If the sensor node 40 enters a wireless service area of a neighboring node, for example, the sink node (S2) 30, the sensor node 40 receives a HELLO message broadcast by the sink node (S2) 30. Upon receiving the HELLO message, the sensor node 40 attempts connection to the sink node (S2) 30 and a reauthentication process is required. A messaging process in this case is described with reference to FIG. 9.

The sink node 30 periodically configures a HELLO message in order to detect an adjacent sink node or to derive connection of a sensor node and broadcasts the HELLO message in step 601. Step 601 is the same as step 501 of FIG. 8 and step 301 of FIG. 6.

The sensor node 40, which has received the HELLO message, confirms whether itself has an authentication ticket. If the authentication ticket is present, the sensor node 40 transmits the authentication ticket to the sink node (S2) 30 to request reauthentication. The sensor node 40 generates a MAC "v[1]=MAC(NK_N, N||S2||S1||t[1]||w[1]||v[0])" and transmits the MAC v[1], and the authentication ticket including a transmitter ID N, a receiver ID S2, a related node ID S1, an encryption function t[1] and a MAC w[1] to the sink node (S2) 30 in step 605.

Upon receiving the authentication ticket, sink node (S2) 30 confirms that the authentication ticket is issued by the sink node (S1) 20 through the related node ID and determines whether the sink node (S1) 20 is a neighboring node. If the sink node (S1) 20 is determined to be a neighboring node, the sink node (S2) 30 searches for a group key AK_S1 of the sink node (S1) 20. The sink node (S2) 30 generates a MAC MAC(AK_S1, N||t[1]) to check the validity of the MAC w[1]. If the MAC w[1] is determined to be valid, the sink node (S2) 30 decodes the encryption function t[1] to derive a random number R2, a Hash value h(K_N‖R2) and a node session key NK_N. The sink node (S2) 30 generates a MAC MAC (NK_N, S2‖S1‖t[1]‖w[1]‖v[0]) and checks the validity of the MAC v[1]. If the MAC v[1] is determined to be valid, the sink node (S2) 30 determines that the authentication ticket received from the sensor node 40 is valid. Next, the sink node (S2) 30 generates a node session key "NK_N*=KDF(R‖R1)" and generates a new authentication ticket including an encryption function "t[2]=E{AK_S2, TS2‖R2‖h(K_N‖R2)‖NK_N}" and a MAC "w[2]=MAC(AK_S2, N‖t[2])". The sink node (S2) 30 generates MACs "v[2]=h(NK_N*‖R1)" and "v[3]=MAC(NK_N, S2‖N‖u[3])" and an encryption function "u[3]=E{NK_N, R1‖TS2‖v[2]‖t[2]‖w[2]}" in step 607. The sink node (S2) 30 transmits its authentication ticket to the sensor node 40 by transmitting a transmitter ID S2, a receiver ID N, the encryption function u[3] and the MAC v[3] in step 609.

The sensor node 40, which has received the authentication ticket, generates a MAC MAC(NK_N, S2‖N‖u[3]) and checks the validity of the MAC v[3]. If the MAC v[3] is determined to be valid, the sensor node 40 decodes the encryption function u[3] to derive an authentication ticket including a random number R1, a time stamp TS2, the encryption function t[2] and the MAC w[2]. The sensor node 40 generates a node session key "NK_N*=KDF(R2‖R1)" and a Hash value "h(NK_N*‖R1)" and checks the validity of the MAC v[2]. If the MAC v[2] is determined to be valid, the sensor node 40 stores a new authentication ticket in correspondence to the sink node (S2) 30. Next, the sensor node 40 generates a MAC "v[4]=MAC(NK_N*, S2‖ACK‖R2‖R1)" and transmits an ACK message including a transmitter ID N, a receiver ID S2 and the MAC v[4] to the sink node (S2) 30 in step 613.

The sink node (S2) 30, which has received the ACK message, generates a MAC MAC(NK_N*, N‖S2‖ACK‖R2‖R1) and checks the validity of the MAC v[4]. If the MAC v[4] is determined to be valid, the sink node (S2) 30 confirms that the sensor node 40 has received the authentication ticket and completes the authentication process for the sensor node 40 in step 615.

As described above, the sink node issues the authentication ticket after performing initial authentication for the sensor node and the sensor node uses the authentication ticket during reauthentication. Accordingly, overhead does not occur between the sink node and the BS node during reauthentication. Such an effect is more useful when the sink node and the BS node are connected by multi-hop.

As described above, according to an embodiment of the present invention, a node can be efficiently and rapidly reauthenticated, when a mobile sensor node is connected to another sink node, after an initial authentication in a dynamic environment of a sensor network, and in this case, the use of resources of the sensor node can be reduced. Further, during reauthentication, the use of resources of an entire sensor network can be reduced, thereby reducing overhead.

Although certain embodiments of the present invention have been described above for illustrative purposes, various modifications, additions, and substitutions are possible, without departing from the scope and spirit of the invention as disclosed in the accompanying claims. Accordingly, the scope of the present invention should not be limited to the description of the embodiment, but defined by the accompanying claims and any equivalents thereof.

What is claimed is:

1. A method for authenticating a sensor node by a first sink node in a sensor network, the method comprising:
   receiving an authentication request using an authentication ticket from the sensor node;
   identifying a second sink node that issued the authentication ticket;
   decoding the authentication ticket using a group key that is stored in correspondence to the second sink node to confirm the validity of the authentication ticket, when the second sink node is included in a neighboring node list;
   processing an authentication for the sensor node;
   generating an authentication ticket using a group key of the first sink node; and
   transmitting the generated authentication ticket to the sensor node.

2. The method of claim 1, further comprising:
   requesting a Base Station (BS) node to authentication the sensor node, upon receiving an initial authentication request from the sensor node; and
   transmitting the generated authentication ticket to the sensor node, upon receiving an authentication success response from the BS node.

3. The method of claim 2, further comprising:
   receiving a HELLO message from a third sink node;
   requesting the BS node to authenticate the third sink node, when the third sink node is not included in the neighboring node list;
   adding the third sink node to the neighboring node list and transmitting the group key of the first sink node to the third sink node, upon receiving an authentication success response from the BS node;
   receiving a group key corresponding to the third sink node from the third sink node; and
   storing the received group key.

4. The method of claim 3, wherein the authentication ticket indicates which sink node issued the authentication ticket, and a period of validity.

5. The method of claim 4, wherein the first sink node periodically broadcasts the HELLO message.

6. An apparatus for authenticating a sensor node by a first sink node in a sensor network, the apparatus comprising:
   a wireless transceiver;
   a storage device for storing a neighboring node list including sink nodes located within a wireless communication range of the first sink node and for storing group keys corresponding to the sink nodes included in the neighboring node list; and
   a controller for receiving an authentication request using an authentication ticket from the sensor node through the wireless transceiver, identifying a second sink node that issued the authentication ticket, decoding the authentication ticket using a group key that is stored in correspondence to the second sink node to confirm validity of the authentication ticket, when the second sink node is included in the neighboring node list, processing an authentication for the sensor node, generating an authentication ticket using a group key of the first sink node, and transmitting the generated authentication ticket to the sensor node through the wireless transceiver.

7. The apparatus of claim 6, wherein the controller requests a Base Station (BS) node to authenticate the sensor node, upon receiving an initial authentication request from the sensor node, and transmits the generated authentication ticket to the sensor node through the wireless transceiver, upon receiving an authentication success response from the BS node.

8. The apparatus of claim 7, wherein the controller confirms, upon receiving a HELLO message from a third sink node, whether the third sink node is included in the neighboring node list, requests the BS node to perform authentication for the third sink node, when the third sink node is not included in the neighboring node list, adds the third sink node to the neighboring node list and transmits the group key of the first sink node to the third sink node through the wireless transceiver upon receiving an authentication success response from the BS node, and stores, upon receiving a group key corresponding to the third sink node, the received group key in the storage device.

9. The apparatus of claim 8, wherein the authentication ticket identifies which sink node issued the authentication ticket, and a period of validity.

10. The apparatus of claim 9, wherein the controller periodically broadcasts the HELLO message through the wireless transceiver.

11. A method for authenticating a sensor node in a sensor network, the method comprising:
receiving a HELLO message from a sink node;
confirming whether an authentication ticket is received, when the sink node is not a currently connected sink node;
transmitting the authentication ticket to the sink node to request authentication, when the authentication ticket is received; and
receiving and storing an arbitrary authentication ticket issued by the sink node, after the sink node determines that the transmitted authentication ticket is a valid ticket issued by one of neighboring nodes of the sink node and performs authentication for the sensor node.

12. The method of claim 11, wherein the authentication ticket is transmitted by an arbitrary sink node, after normal authentication for the sensor node is performed by the arbitrary sink node.

13. The method of claim 11, further comprising:
requesting the sink node to perform an initial authentication, when the authentication ticket is not received; and
receiving and storing the arbitrary authentication ticket issued by the sink node, after authentication for the sensor node is performed by the sink node and a Base Station (BS) node.

14. The method of claim 13, wherein the sink node stores group keys corresponding to sink nodes corresponding to the neighboring nodes, confirms the transmitted authentication ticket using a group key corresponding to a sink node that issued the authentication ticket, and generates the arbitrary authentication ticket using its group key.

15. The method of claim 14, wherein the sensor node transmits a most recently received authentication ticket to the sink node, when the sensor node includes at least two authentication tickets.

16. An apparatus for authenticating a sensor node in a sensor network, apparatus comprising:
a wireless transceiver;
a storage device; and
a controller for confirming, upon receiving a HELLO message from a sink node through the wireless transceiver, whether an authentication ticket is received when the sink node is not a currently connected sink node, transmitting the authentication ticket to the sink node to request authentication, when the authentication ticket is received, receiving, through the wireless transceiver, an arbitrary authentication ticket issued by the sink node, after the sink node determines that the transmitted authentication ticket is a valid ticket issued by one of neighboring nodes of the sink node and performs authentication for the sensor node, and storing the arbitrary authentication ticket in the storage device.

17. The apparatus of claim 16, wherein the authentication ticket is transmitted by an arbitrary sink node, after normal authentication for the sensor node is performed by the arbitrary sink node.

18. The apparatus of claim 16, wherein the controller requests the sink node through the wireless transceiver to perform an initial authentication, when the authentication ticket is not received, receives the arbitrary authentication ticket issued by the sink node, after authentication for the sensor node is performed by the sink node and a Base Station (BS) node, and stores the arbitrary authentication ticket in the storage device.

19. The apparatus of claim 18, wherein the sink node stores group keys corresponding to sink nodes corresponding to the neighboring nodes, confirms the transmitted authentication ticket using a group key corresponding to a sink node that issued the authentication ticket, and generates the arbitrary authentication ticket using its group key.

20. The apparatus of claim 19, wherein the controller transmits a most recently received authentication ticket to the sink node through the wireless transceiver, when at least two authentication tickets are stored in the storage device.

* * * * *